United States Patent [19]

Havens

[11] Patent Number: 4,721,467

[45] Date of Patent: Jan. 26, 1988

[54] METRIC SYSTEM TEACHING/PLAYING CARDS

[76] Inventor: Mark A. Havens, P.O. Box 80534, San Diego, Calif. 92107

[21] Appl. No.: 812,715

[22] Filed: Dec. 23, 1985

[51] Int. Cl.[4] ........................ G09B 19/00; A63F 1/00
[52] U.S. Cl. .................................... 434/187; 273/302; 434/209; D21/42
[58] Field of Search ............... 434/187, 209; 273/302, 273/303, 292, 299, 301, 294; D21/42–47

[56] References Cited

U.S. PATENT DOCUMENTS

| | | | |
|---|---|---|---|
| 480,119 | 8/1892 | McCourt | 434/187 |
| 1,354,707 | 10/1920 | Waterhouse | 273/302 X |
| 1,392,977 | 10/1921 | Swan | 273/301 |
| 1,666,996 | 4/1928 | Douglas | 273/302 X |
| 3,501,854 | 3/1970 | Hollingsworth | 434/209 |
| 3,661,392 | 5/1972 | Abney | 434/209 X |
| 3,879,041 | 4/1975 | Hester | 434/187 X |
| 4,021,923 | 5/1977 | Feldman | 434/187 X |
| 4,333,656 | 6/1982 | Sommer | 273/299 |
| 4,512,746 | 4/1985 | Turner | 434/209 |

OTHER PUBLICATIONS

*Mathematics Teacher*, Jan. 1977, pp. 52–53.
*Mathematics Teacher*, Mar. 1977, p. 276.
*Mathematics Teacher*, Apr. 1979, pp. 254–269.
*The Modernized Metric System*, The Science Teacher, May, 1969, vol. 36, No. 5, p. 41.

Primary Examiner—William H. Grieb
Attorney, Agent, or Firm—Calif Kip Tervo

[57] ABSTRACT

The invention comprises a deck of playing cards for teaching and learning basic metric system words and prefix values in an enjoyable manner. The deck comprises a plurality of suits of cards; each suit includes a plurality of cards with each card within a suit having a back side and a front side. On the front side, a relative metric prefix value indicates the value of each card. The deck comprises four suits of thirteen cards in each suit thereby facilitating use of the cards in playing traditional card games. According to one embodiment, the front of each card includes a list of the values of all cards within the suit in order and, the value of that particular card is distinguished in the list of values. The invention also includes a plurality of decks of cards which are dividable into decks having different levels of difficulty.

9 Claims, 4 Drawing Figures

METRIC SYSTEM TEACHING/PLAYING CARDS

BACKGROUND OF THE INVENTION

Field of the Invention

This invention relates in general to cards for teaching the metric system and, more specifically, involves several decks of cards of differing difficulty for acquainting students with metric systems values.

Background of the Invention

The metric system is rapidly becoming the dominant measuring system in the world arena, and it is highly desirable for persons to become acquainted with and to learn the metric nomenclature and values. In the teaching of mathematics and number values to beginning students and others having difficulty with mastering the concepts and rules, it has been found to be efficacious to present the material in an enjoyable manner, such as in the form of a game, and to utilize games of various levels of difficulties as the students progress It is therefore desirable to have a method of teaching and learning basic metric system values which can employ visual aids, such as cards, and use game playing to make the teaching an enjoyable experience for the students. Therefore, it is desirable to have playing cards of relative metric values, and it is further desirable to have a deck of metric value playing cards equivalent to traditional playing cards, i.e, having four suits of thirteen cards each, so that traditional card games may be played with these cards thus contributing to their utility.

SUMMARY OF THE INVENTION

This invention is a means for teaching metric system words and value prefixes utilizing playing cards, and it generally comprises a deck of metric system teaching/playing cards including a plurality of suits of cards within each deck. Each suit includes a plurality of cards with each card within a suit having a back side and a front side. On the front side of each card the value of each card is indicated as a relative metric prefix value. In a preferred embodiment, the deck of cards comprises four suits with thirteen card in each suit. According to another exemplary embodiment, the front of each card includes a list of the value of all cards in the suit in order, and the value of the instant card is distinguished in the list of the values. According to a further precept of the invention, a series of metric system teaching/playing cards comprises a plurality of decks of cards which are dividable into decks having different levels of difficulty.

Other features and many attendant advantages of the invention will become more apparent upon a reading of the following detailed description together with the drawings, wherein like reference numerals refer to like parts throughout.

DETAILED DESCRIPTION OF THE INVENTION

This invention uses a plurality of decks of cards to introduce a learner to basic metric words and value prefixes. Each deck contains four suits of thirteen cards, each to facilitate playing traditional card games with the card values. The decks vary in difficulty as to the amount of knowledge the student needs to recognize relative to metric values.

Figure 1:
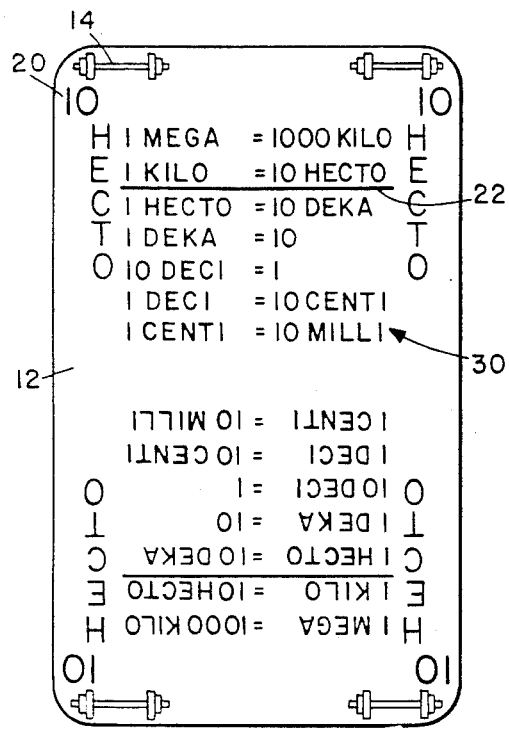
FIG. 1 shows the front face of an introductory card indicating relative card values.

With reference now to the drawing, and more particular to FIG. 1 thereof, there is shown the front face 12 of a typical card 10 from the introductory deck or deck 1. Deck 1 provides a basic introduction to the metric system. Its objective is to introduce the player to the following words, their values and their relationship to each other: MILLI, CENTI, DECI, DEKA, HECTO, KILO, and MEGA.

Deck 1 is comprised of four suits having appropriate differentiating symbols. In the preferred embodiment, the suits are "wrench," "water," "weight" and "arrow." Appropriate suit symbols 14 are placed in the corner of each card. The suits may be distinguished by color. In the preferred embodiment, the "wrench" and "weight" suits are red. The "water" and "arrow" suits are blue. Each suit has thirteen cards. Even though each suit has thirteen cards, there are only seven values in each suit as follows:

1 MEGA=1000 KILO; 1 KILO=10 HECTO; 1 HECTO=10 DEKA;

1 DEKA=10; 10 DECI=1; 1 DECI=10 CENTI; and

1 CENTI=10 MILLI.

As shown in FIG. 1, each card 10 has the above listed distinguishing values 30 printed on it to aid the user. Each card has a value. The card value 20 is printed near the corner of the card. Additionally, this relative value is distinguished 22 in the value list 30 to aid the user in recognizing and comprehending the relative value of the card. Although any appropriate distinguishing method could be used, in the example show, the card value is underlined in the value list 30. As seen, the deck 1, card 10, shown, may include the metric system prefixes and their relative values, being in front of the student at all times on each card.

Figure 2:
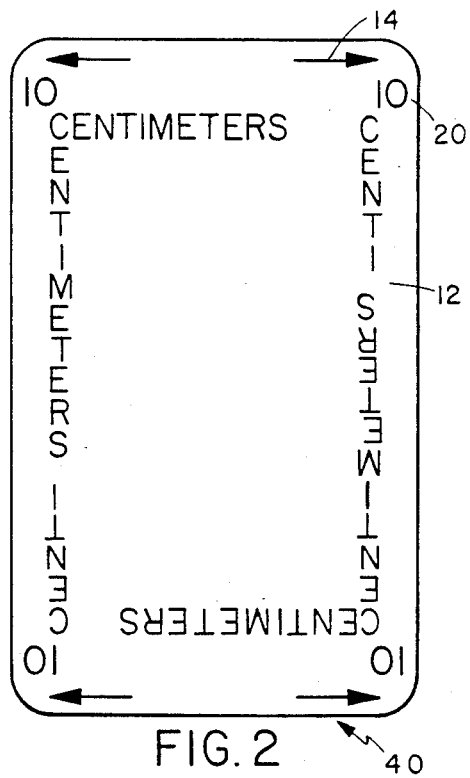
FIG. 2 illustrates a typical card from a more advanced deck.

FIG. 2 illustrates a typical intermediate card from deck 2 which is an intermediate introduction to the metric system. The object of deck 2 is to introduce the player to the following words, their values, and their relationship to each other: MILLIMETER; CENTIMETER, DECIMETER, METER DEKAMETER, HECTOMETER, and KILOMETER. Deck 2 is divided into four distinguishable suits such as "rule," "world globe," "wrench," and "arrow." An appropriate suit symbol 14 is shown in the corner of each card. In the preferred embodiment, the "rule" and "arrow" suits are red. The "world globe" and "wrench" suits are blue. The card values 20 are : 1 MILLIMETER, 10 MILLIMETERS, 1 CENTIMETER, 10 CENTIMETERS, 1 DECIMETER, 10 DECIMETERS, 1 METER, 10 METERS, 1 DEKAMETER, 10 DEKAMETERS, 1 HECTOMETER, 10 HECTOMETERS, and 1 KILOMETER. The last twelve card values listed above consist of six equivalent-value pairs, e.g. 10 MILLIMETERS=1 CENTIMETER, 10 CENTIMETERS=1 DECIMETER, etc. Because of these equivalentvalue pairs, even though each suit has thirteen card values 20, each suit has only seven real values.

Of course, by some convention, these values could maintain a hierarchy so thirteen values are obtained. For example, the cards as listed above could be taken as the ascending value order, i.e. when compared with a card of equivalent real value, the card having the smallest prefix value is considered to be of lesser value. With such a convention, the deck is suitable for use in regular card games requiring four decks of thirteen card values each. Deck 2 introduces the metric word for linear measurement, i.e. meter, along with the various prefixes. The card value 20 is written in the corner of the card. However, there is no value list 30, as in deck 1. Introductory decks 3 and 4 are similar to deck 2, and a card from these decks is not shown. Deck 3 introduces the metric word for volume, i.e. liter, and deck 4 introduces the metric word for mass measurement, i.e. gram. Decks 3 and 4 use liter and gram, respectively, where deck 2 uses meters.

Figure 3:
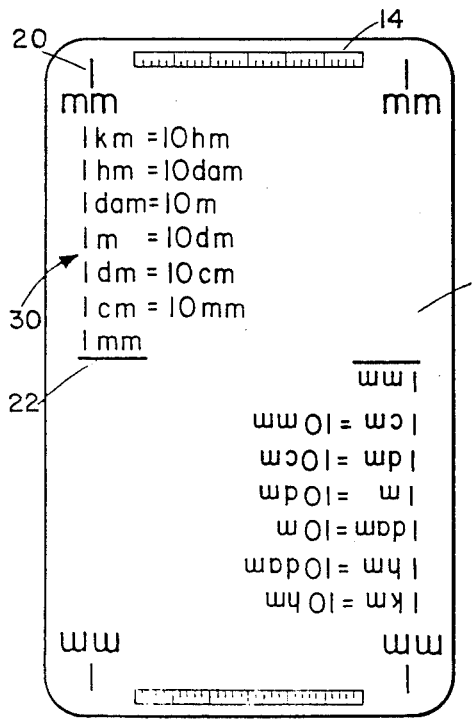
FIG. 3 illustrates the front face of a card from yet another deck.

Deck 5 is an advanced introduction to the metric system abbreviations and words. The objective of deck 5 is to introduce players to the abbreviated prefix and measurement words, their values and their relationship to each other. Deck 5 is comprised of fours suits of distinguishing symbols such as "world globe," "rule," "water" and "weight." The "rule" and "weight" suits are red. The "world globe" and "water" suits are blue. The front face of a typical card from deck 5 is shown in FIG. 3. The card value 20 is printed in the card corner with the metric value in abbreviated form. A value list 30 showing the relative values is printed on the card face 12. The value of the card may be distinguished 22 in the value list by appropriate means such as underlining.

Figure 4:
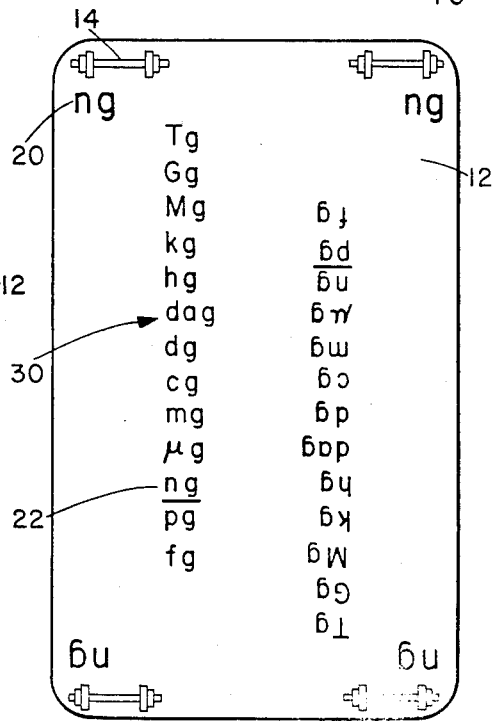
FIG. 4 illustrates the front of a card from yet another advanced deck.

Deck 6 also represents an advanced introduction to the metric system abbreviations and words. The objective of deck 6 is to introduce players to the following metric prefixes, their relationship to each other and their abbreviations: FEMTO, PICO, NANO, MICRO, MILLI, CENTI, DECI, DEKA, HECTO, KILO, MEGA, GIGA, and TERA. Deck 6 contains four suits such as "world globe," "rule," "water" and "weight." Two of the suits are of one color and two of the suits are of another color. There are thirteen cards in each suit and each suit has thirteen values. FIG. 4 illustrates a typical card from the weight suit of deck 6. Suit symbol 14 and card value 20 are located in a corner. Card face 12 also contains the value list 30 with the card value distinguished 22. The rule suit includes the abbreviation for meters; the weight suit, the abbreviation for grams; and the water suit, the abbreviation for liters. The world globe suit may contain only the prefix abbreviations or, alternately, the card value 20 may be the full prefix.

The decks are comprised of four suits of thirteen cards each to facilitate the playing of any standard card game. Also, the cards may be used in various ways. For example, a teacher may pass out cards to students from decks 2-5, and for example, ask them to discard one card of the appropriate suit, i.e. meter, gram, or liter, as appropriate to answer questions such as: What is the standard unit of measurement for milk? For flour? For wrench size? etc. The object is for the player to be the first to discard all his cards. Many other teacher/student games are possible. Of course, many games for younger players, such as War or Slap-Jack, are possible.

From the foregoing description, it is seen that the present invention provides a useful and enjoyable manner of learning relative metric values.

The invention has been shown and described with reference to certain specific embodiments, however it is intended to cover in the appended claims such modification and changes as come within the true spirit and scope of the invention.

I claim:

1. A deck of metric system teaching/playing cards comprising:
   a suit having:
   a plurality of cards; each card having a front side and a back side; each front side bearing a unique distinguishing value comprising a multiple of ten and a metric prefix; and
   wherein a plurality of said cards have a distinguishing value which, although differing in expression, is equivalent in real value to said distinguishing value of another of said cards.

2. The deck of claim 1 comprising:
   four suits of thirteen cards each; said distinguishing value of the cards in each suit being identical to the distinguishing value of cards in the other suits.

3. The deck of claim 1 wherein said distinguishing value includes a metric unit of measurement.

4. A deck of metric system teaching/playing cards comprising:
   a suit having:
   a plurality of cards; each card having a front side and a back side; each front side bearing a unique distinguishing value comprising a multiple of ten and a metric prefix; and
   wherein a plurality of said cards having a distinguishing value which, although differing in expression, is equivalent in real value to said distinguishing value of another of said cards; and
   wherein said front side of each card further bears:
   a list of all said distinguishing values in order.

5. The deck of claim 4 wherein said front side includes:
   differentiating means for differentiating that card's distinguishing value from the others in said list.

6. The deck of claim 5 comprising:
   four suits of thirteen cards each; said distinguishing value of the cards in each suit being identical to the distinguishing value of cards in the other suits.

7. The deck of claim 5 wherein said distinguishing value includes a metric unit of measurement.

8. A deck of metric system teaching/playing cards comprising:
   a suit having:
   a plurality of cards; each card having a front side and a back side; each front side bearing a different distinguishing metric prefix; and
   wherein said front side of each card further bears;
   a list of all said distinguishing metric prefixes in order.

9. The deck of claim 8 wherein said front side further includes:
   differentiating means for differentiating that card's metric prefix from the other's in said list.

* * * * *